April 28, 1959 P. G. STULTZ ET AL 2,884,097
MECHANICAL BRAKE SLACK ADJUSTER FOR
RAILWAY CAR FOUNDATION BRAKES
Filed Dec. 22, 1954 8 Sheets-Sheet 1

INVENTORS
POSY G. STULTZ
POSY G. STULTZ, JR.
BY Mawhinney & Mawhinney
ATTORNEYS

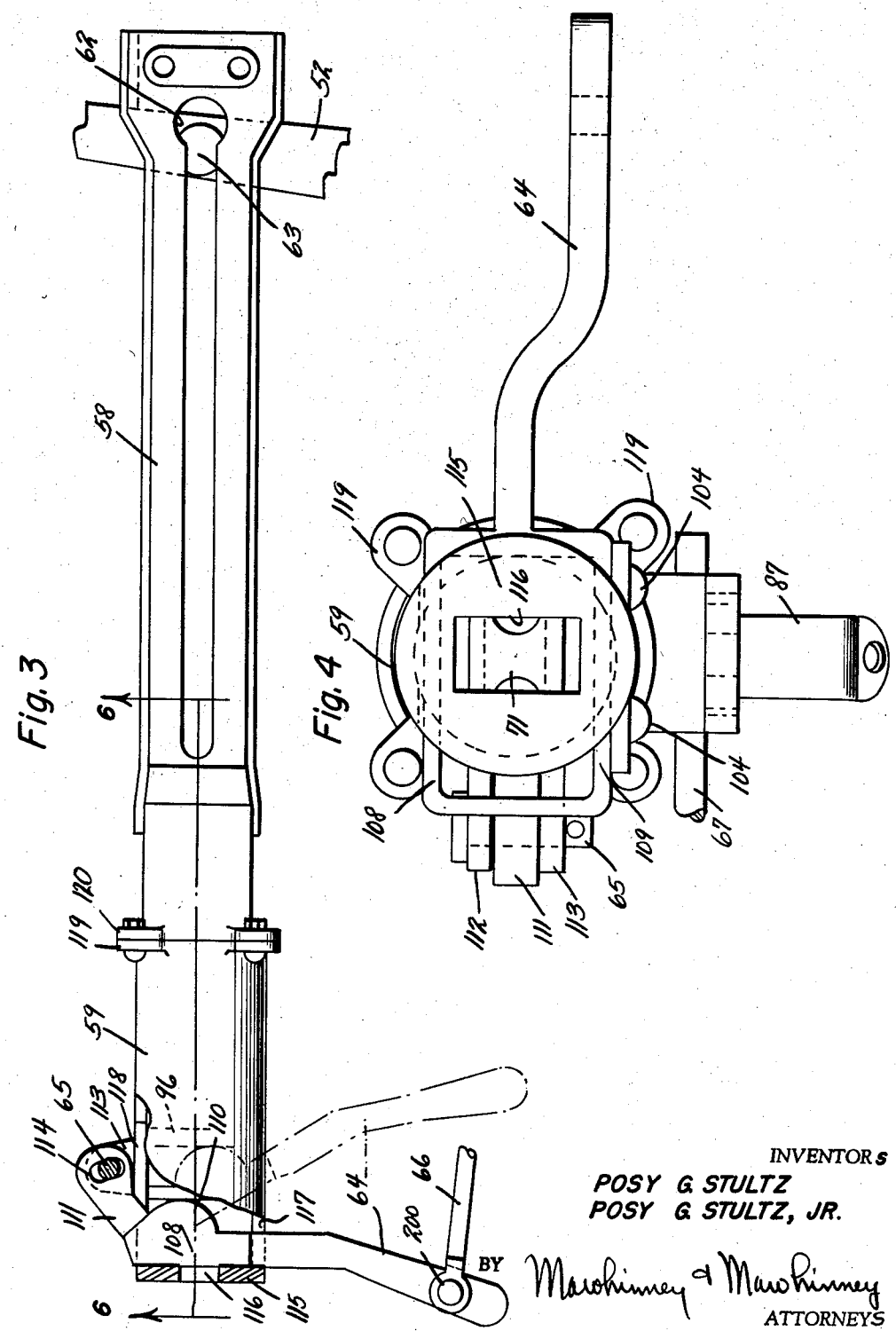

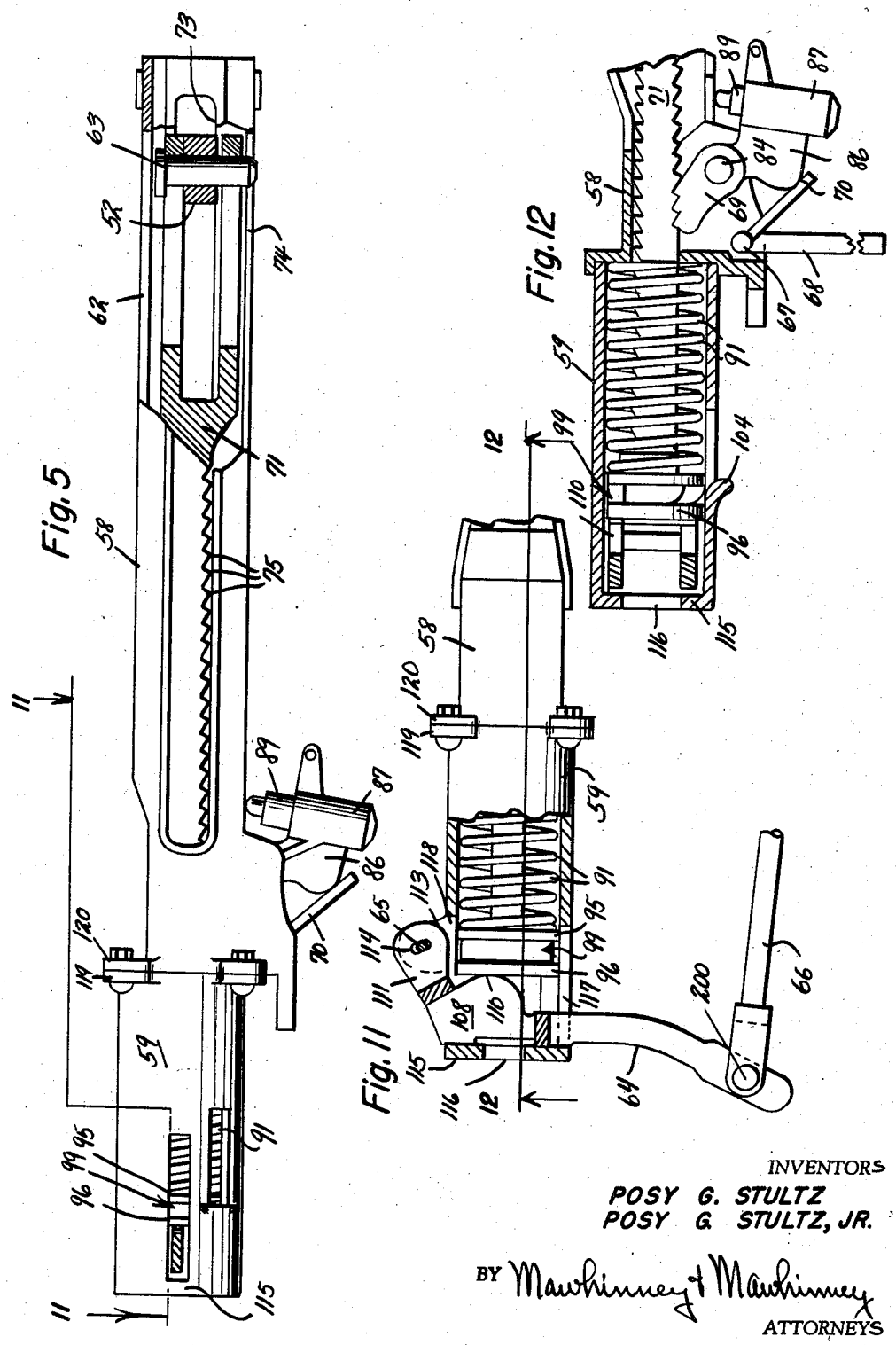

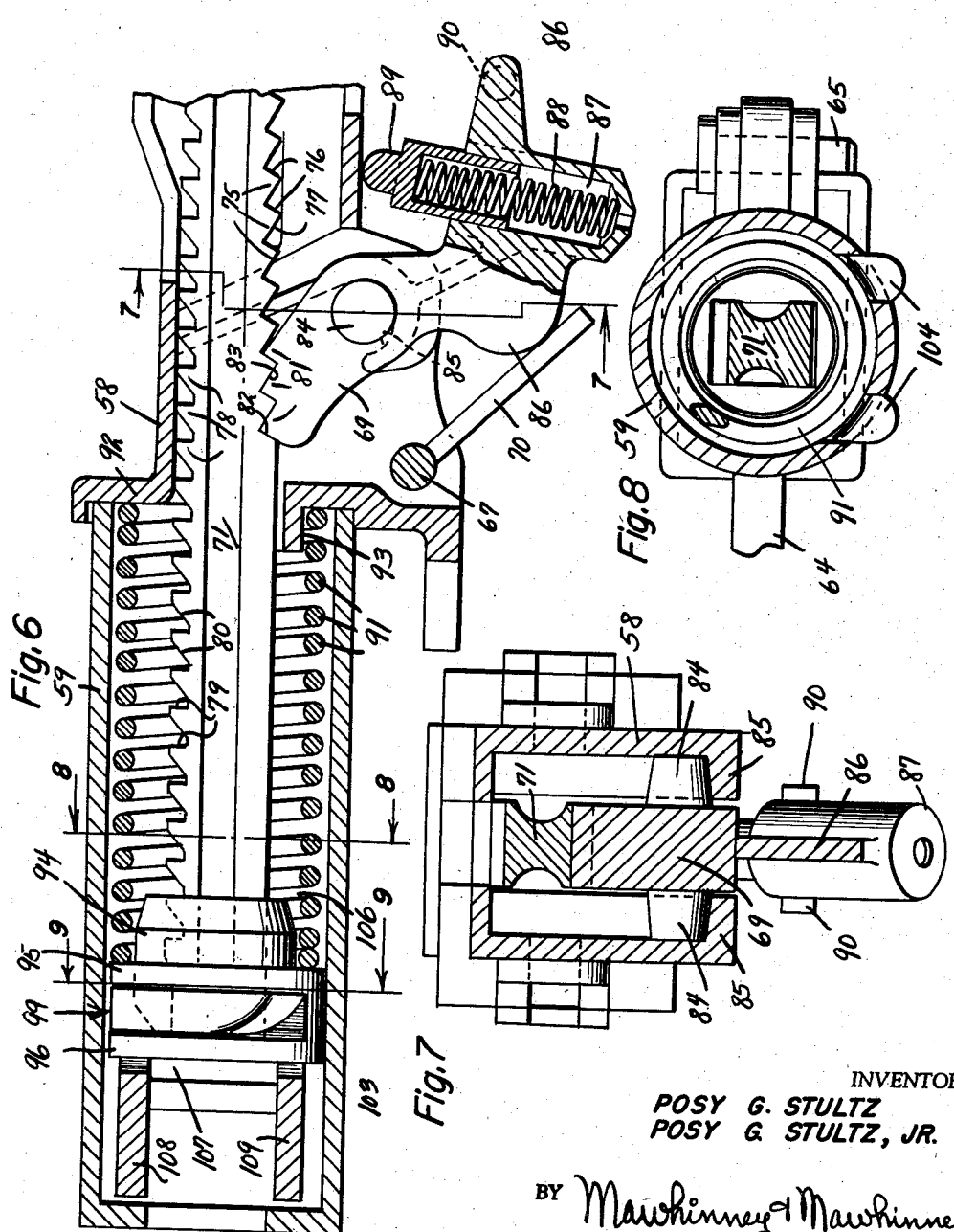

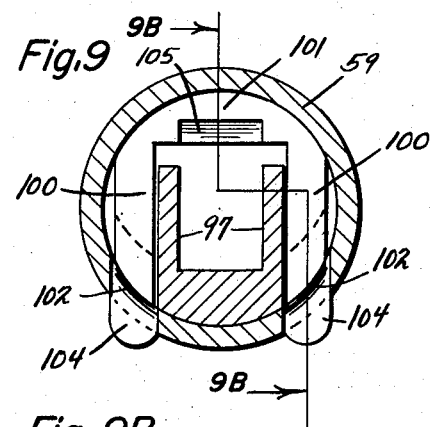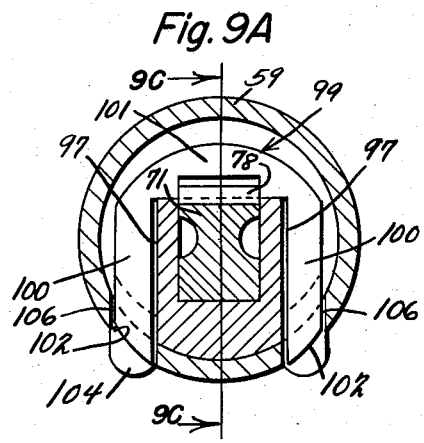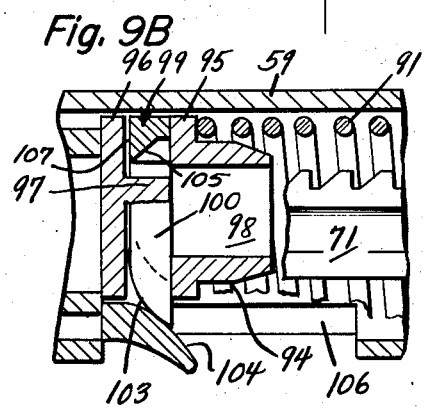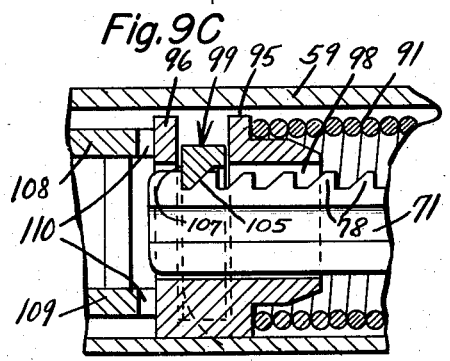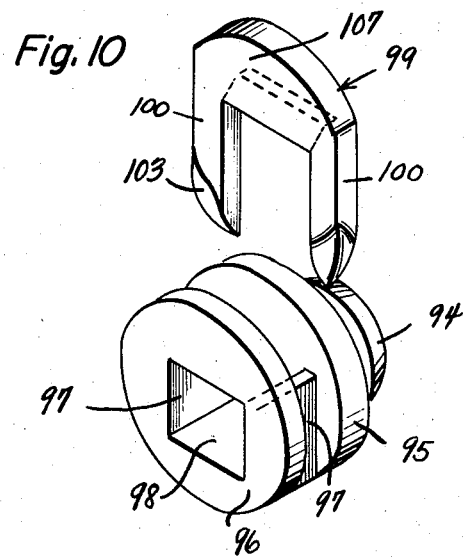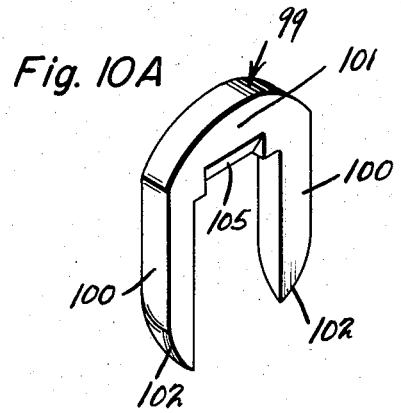

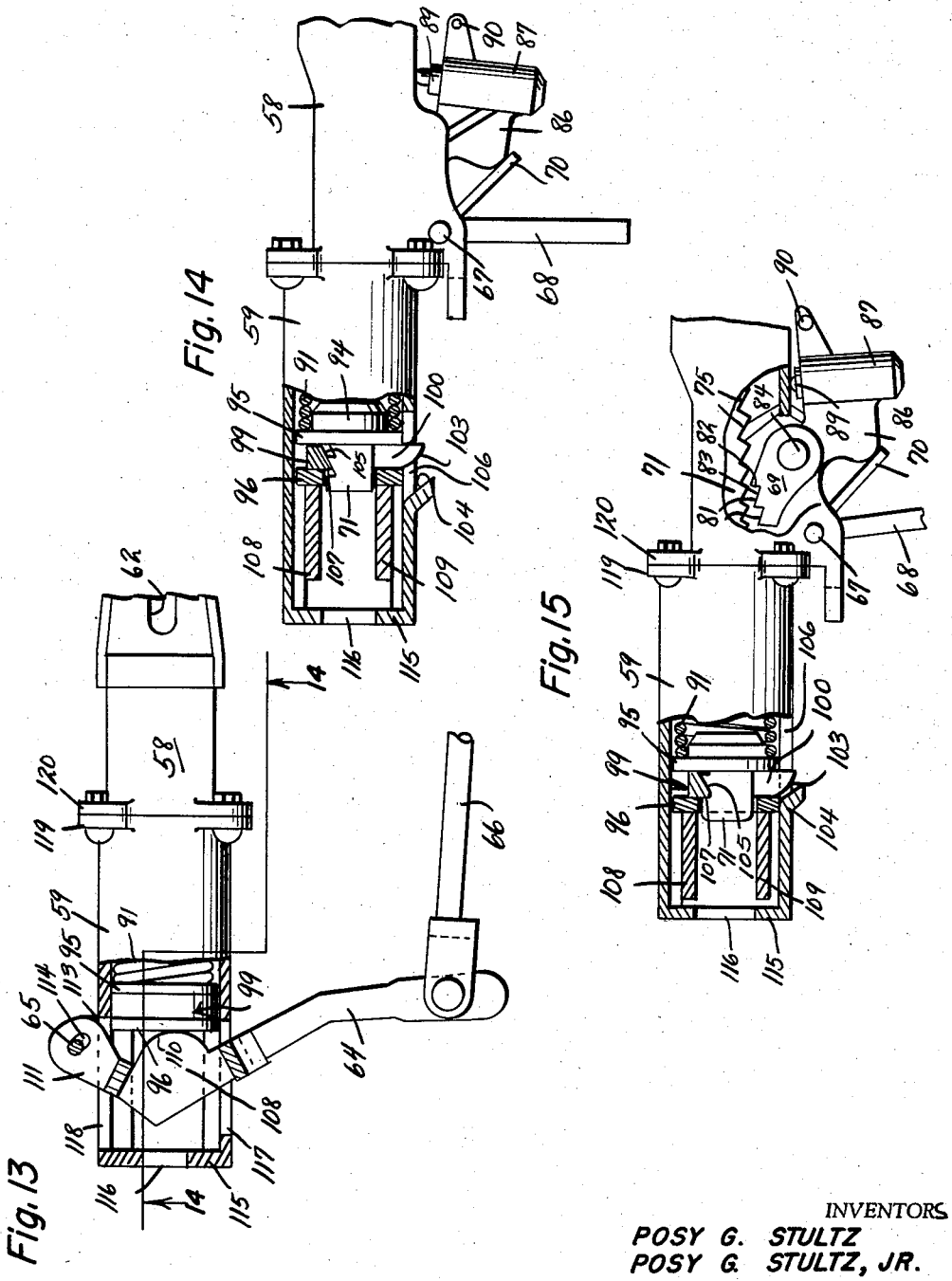

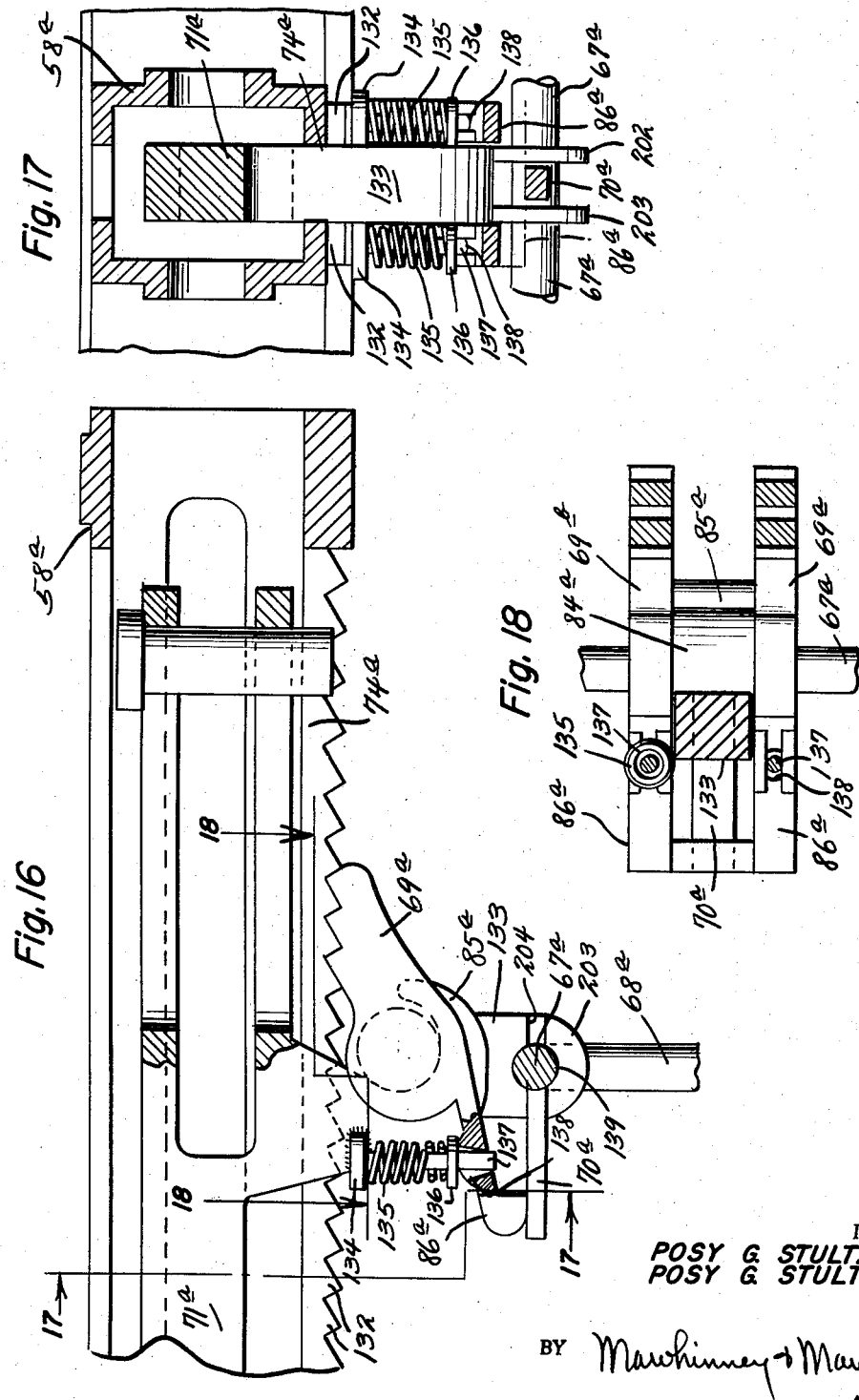

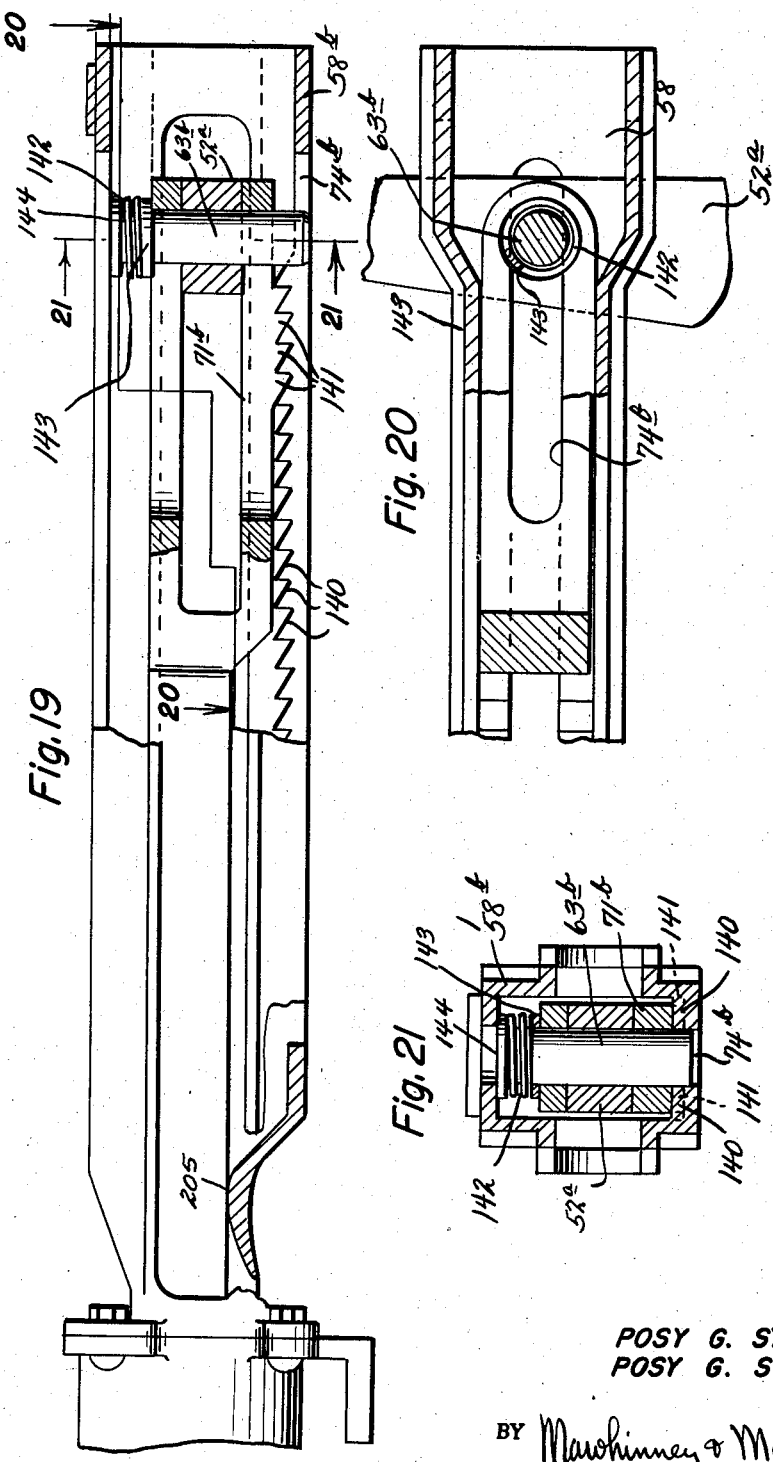

United States Patent Office 2,884,097
Patented Apr. 28, 1959

2,884,097

MECHANICAL BRAKE SLACK ADJUSTER FOR RAILWAY CAR FOUNDATION BRAKES

Posy G. Stultz and Posy G. Stultz, Jr., Roanoke, Va., assignors to Charles M. O'Boyle, Wilmington, Del.

Application December 22, 1954, Serial No. 476,930

17 Claims. (Cl. 188—196)

The present invention relates to mechanical brake slack adjuster for railway car foundation brakes and has for an object to provide an automatic mechanism of a mechanical nature which will take up the slack in the brake rigging in small increments as it occurs incident to wear of the brake shoes.

It is another object of the invention to provide a mechanical brake slack adjuster for railway car foundation brakes in which a simple form of mechanical movement is applied by a novel form of pawl and ratchet mechanism to move a rack bar entrained with the brake rigging through small increments of movement in a direction to take up slack, the mechanical movement being coupled to any movable part of the foundation brake, for instance, to the brake cylinder lever to be automatically actuated thereby concomitantly with the applications of the brake by the engineer.

The invention has for a further object to provide a novel form of motor forming a part of the mechanical movement above referred to by which the rack bar is driven directly on its slack take-up strokes.

The invention has for a still further object to provide, in the motor referred to, a novel form of plunger entraining therewith a novel form of drive pawl movable into and out of the teeth of the rack bar by a novel form of device and movement which will ensure faithful performance which is a requirement pursuant to rigid rules and regulations of presently constituted governing bodies.

A still further object of the invention is to provide a mechanical brake slack adjuster of few and simple parts organized into a compactly operating mechanism which is coupled to the foundation brake and derives its movement therefrom well within the permissible proportion of power which may be abstracted from the power output of the foundation brake mechanism.

With foregoing and other objects in view, the invention will be more fully described hereinafter, and will be more particularly pointed out in the claims appended hereto.

In the drawings, wherein like symbols refer to like or corresponding parts throughout the several views:

Figure 3 is an enlarged plan view, with parts broken away and parts shown in section, of the improved mechanical brake slack adjuster showing the motor lever in full and dotted line positions and showing the floating lever broken away.

Figure 4 is an end view taken from the lefthand end of Figure 3 on a much magnified scale.

Figure 5 is a side elevational view of the improved mechanical brake slack adjuster, according to one form thereof, with a floating lever shown in section.

Figure 6 is a longitudinal sectional view taken on an enlarged scale on the line 6—6 of Figure 3 and showing the motor in the rest position.

Figure 7 is a cross-sectional view taken on the line 7—7 in Figure 6.

Figure 8 is a transverse sectional view taken on the line 8—8 in Figure 6.

Figure 9 is also a transverse sectional view taken on the line 9—9 in Figure 6 with the pawl raised.

Figure 9A is a similar view with the pawl in dropped position.

Figure 9B is a vertical sectional view taken on the line 9B—9B of Figure 9.

Figure 9C is a vertical sectional view taken on the line 9C—9C of Figure 9A.

Figure 10 is a perspective exploded view of one form of plunger and take-up or drive pawl employed in connection with the invention.

Figure 10A is a perspective view of the pawl taken from the side opposite that shown in Figure 10.

Figure 11 is a longitudinal section taken on the line 11—11 of Figure 5 and showing the motor in the rest position.

Figure 12 is a longitudinal section taken on the line 12—12 in Figure 11 and also showing the motor in the rest position.

Figure 13 is a view similar to Figure 11 showing the motor in the cocked position.

Figure 14 is a longitudinal sectional view taken on the line 14—14 in Figure 13 and also showing the cocked position of the motor.

Figure 15 is a view similar to Figure 14 showing the motor on its return stroke with the take-up pawl interlocked with the rack bar and entraining the rack bar to move with the plunger.

Figure 16 is a fragmentary longitudinal sectional view taken through the rack bar housing and rack bar and showing a modified form of holding pawl arrangement.

Figure 17 is a vertical sectional view taken on the line 17—17 of Figure 16.

Figure 18 is a horizontal sectional view taken on the line 18—18 of Figure 16.

Figure 19 is a fragmentary horizontal sectional view of a still further modified form of housing and rack bar with a modified form of holding pawl arrangement.

Figure 20 is a horizontal longitudinal sectional view taken on the line 20—20 of Figure 19.

Figure 21 is a vertical sectional view taken on the line 21—21 of Figure 19.

Figure 1:
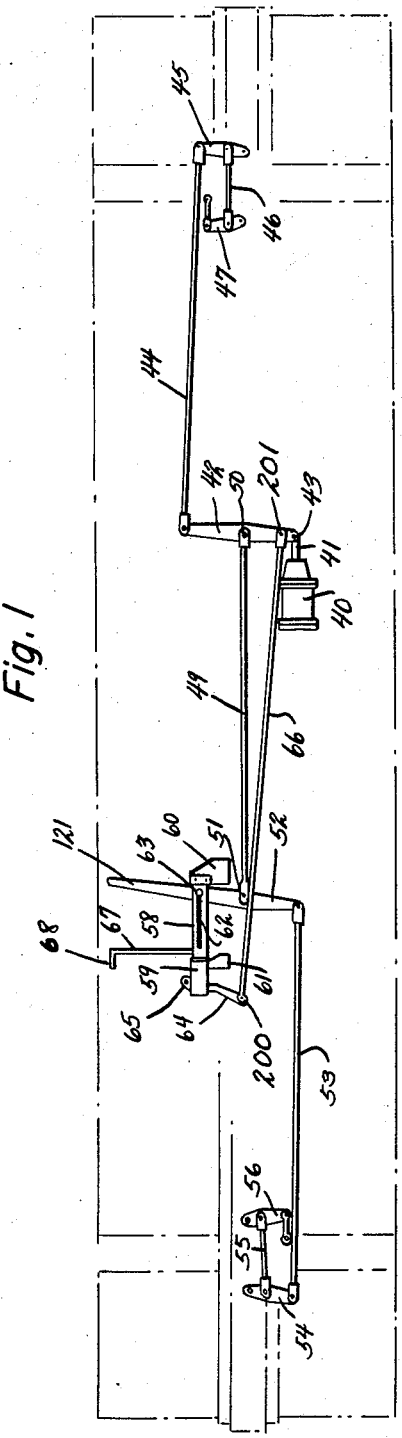
Figure 1 is a diagrammatic plan view of a foundation brake of a form found on box railway freight cars and illustrating a mechanical brake slack adjuster according to the present invention as coupled to the floating lever and the brake cylinder lever in one form of coupling of the improved device in the foundation brake system.
Figure 2:
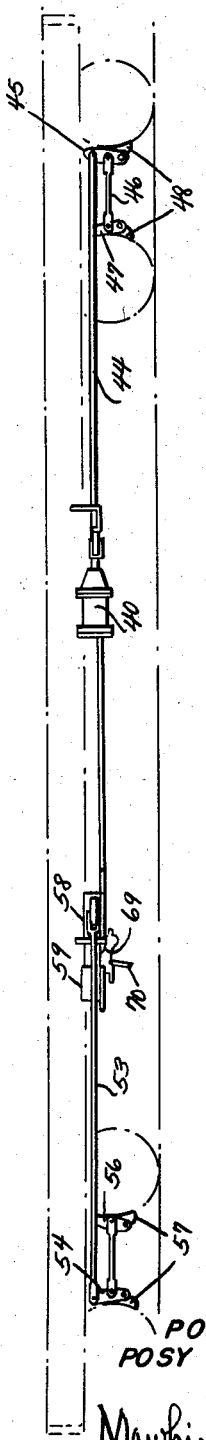
Figure 2 is a side elevational view of the same.

Referring for the present to Figures 1 and 2, 40 designates a brake cylinder, 41 the sliding push rod and 42 represents the brake lever which is fulcrumed at its lower end to the push rod 41, as indicated at 43.

To the upper end of the brake lever 42 is pivoted the inner end of an end rod 44 which extends over to one of the trucks of the car and is there pivoted to the live lever 45 which is coupled in the usual manner by the rod 46 to the dead lever 47. The levers 45, 47 control the application of the brake shoes 48, illustrated in Figure 2, in a well-known manner.

At an intermediate portion of the brake lever 42, the center rod 49 is pivoted as indicated at 50. This center rod 49 is also pivoted at 51 to a floating lever 52 to an end of which is pivoted the end rod 53 which runs to the truck at the opposite end of the car and is there pivoted to the live lever 54. Motion is communicated in the usual way from the live lever 54 through the bottom or other rod 55 to the dead lever 56 and thence to the brake shoes 57 shown in Figure 2.

This is a well-known form of foundation brake to be found on many types of railway freight box cars.

A form of the improved mechanical brake slack adjuster is, or may be, included in the foundation brake system as shown in Figures 1 and 2 in which 58 designates the rack bar housing and 59 the motor cylinder which are preferably connected together in a unit as hereinafter described. Brackets 60 and 61 may be employed for holding the rack bar housing 58 and the motor cylinder beneath the car and to appropriate framework of such car. The housing 58 is shown as having a top slot 62 for the entering downwardly therethrough of a fulcrum pin 63 by which the floating lever 52 is connected to the rack bar.

A motor lever 64 is shown as extending through the motor cylinder 59 and having a fulcrum point 65. The opposite end of the motor lever 64 is connected by a rod 66 to the cylinder lever 42 preferably at a point adjacent the connection 43 of the cylinder lever with the push rod 41. A release rod 67 is rotatably mounted in the housing 58 and has a handle 68 at one side of the car for convenient manipulation. In Figure 2, the holding pawl is indicated at 69 adjacent a finger 70 of the release rod 67 which when rotated disengages the holding pawl from the rack bar as hereinafter more fully explained.

A rack bar 71 is slidably mounted in the housing 58 with a forward portion projecting into the motor cylinder 59 in the initial position of the rack bar. By initial position of the rack bar is meant the position occupied by the rack bar with new shoes upon the brake beams. This will be the position of the rack bar as indicated in Figures 5 and 6. As the rack bar is moved forwardly, that is, to the left as illustrated in Figures 5 and 6, from the initial position toward a final position where the brake shoes are completely worn requiring replacement, the forward end portion of the rack bar may move completely through the motor cylinder 59 and out for a distance beyond the forward head thereof.

As seen in Figure 5, the righthand end, that is, the rear end, of the rack bar 71 is bifurcated to provide a horizontal slot for receiving therethrough the floating lever 52, which also passes through side slot 73 in the housing 58. The housing 58 is also preferably provided with a longitudinally extending bottom slot 74 through which the lower end of the pivot pin 63 moves.

The rack bar 71 is provided with a lower set of ratchet teeth 75 having forward abrupt shoulders 76 and rear inclined faces 77. Such rack bar 71 is also provided with an upper set of ratchet teeth 78 also having forward abrupt shoulders 79 and rear inclined faces 80.

The teeth 81 of the holding pawl 69 are positioned to engage with the lower series of teeth 75 of the rack bar 71 as shown more particularly in Figures 6 and 15. These teeth 81 have forward abrupt faces 82 and rear inclined faces 83 to match the similar faces of the rack bar lower teeth 75.

The holding pawl 69 has trunnions 84 projecting laterally therefrom and adapted to be removably entered into the loose bearings 85 in the dropped side walls of the housing 58. The heel 86 of the holding pawl 69, that is the side or part of the holding pawl at the opposite side of the pivot 84 from the toothed segment 81 is positioned in proximity to the finger 70 so that this finger 70 may be swung over manually to cause disengagement of the teeth 81 of the holding pawl 69 from the lower teeth 75 of the rack bar 71.

The heel end 86 of the holding pawl 69 preferably carries a socket 87 in which is housed a coil spring 88 for thrusting a slidable cap 89 up against the bottom wall or other portion of the housing 58; this for the purpose of yieldably urging the teeth 81 of the holding pawl 69 into engagement with the teeth 75 on the lower edge of the rack bar 71. The holding pawl 69 is also preferably provided with an additional release handle 90 for manual rotation of the holding pawl 69 to the position beyond that shown in Figure 15, to fully disengage the teeth 81 of the pawl 69 from the teeth 75 of rack bar 71.

In the cylinder 59 is housed a motor coil spring 91 or other resilient expansible and contractile element abutting at its rear end against an end head or wall 92 of the cylinder 59 which, in the instance shown in Figure 6, may be provided upon the rack bar housing 58. On the wall or some other fixed part is a forwardly projecting boss 93 adapted to enter one or more end convolutions of the spring 91. The top surface of the boss 93 provides a support for the rack bar 71 when the holding pawl 69 is completely disengaged from the rack bar 71. The spring 91 is of an internal diameter to permit the rack bar 71 to slide freely therethrough. At its forward end the coil spring 91 engages over a rearwardly projecting boss 94 on the rear head 95 of a plunger which is mounted to reciprocate in the cylinder 59. This plunger is completed by a forward head 96 which is spaced forwardly from the rear head 95 by side walls 97. These side walls or webs 97 are of low height, as indicated in Figure 9 and they are also set in from the outside diameter line of the heads 95, 96 which are substantially circular in order to conform generally to the internal configuration of the cylinder 59. The arrangement of the side walls or webs 97 is such as to accommodate a take-up pawl 99.

The pawl 99 is comprised by a pair of legs 100 open at the bottom and connected at the top by a top yoke 101. This pawl 99 is slidable vertically in the space between the heads 95 and 96, which latter engage the pawl forwardly and rearwardly and therefore entrain the same to move with the plunger. As shown in Figure 9, the legs 100 slide up and down on the outside surfaces of the side walls or webs 97. The plunger has an opening 98 there through for the passage of the rack bar 71.

As shown in Figure 9, the lower edges of the legs 100 are rounded as indicated at 102 to conform substantially to the internal curvature of the cylinder 59. Forward lower edges of the legs 100 are beveled as shown at 103 to cooperate with cam abutments 104 depending from the cylinder 59 in position to be encountered by the legs 100 in the dropped position of the pawl 99 as the same moves forwardly with the plunger under the urge of the compressed spring 91 (Fig. 15). The yoke 101 is provided with an inclined surface 105 along its lower edge to complement the inclined surfaces 80 of the teeth 78 on the upper edge of the rack bar with which this pawl cooperates. In the bottom of the cylinder 59 rearwardly of the cam abutments 104 are slots 106 positioned to receive the lower beveled portions of the legs 100 of the pawl 99 in the dropped position of the latter. The forward edge of the yoke 101 of the take-up pawl is substantially vertical as indicated at 107, this being the working surface of the pawl which is adapted to interlock with the substantially vertical abrupt shoulders 79 of the upper series of teeth 78 of the rack bar 71. It will be noted particularly from Figure 9 that the beveled undersurface 105 of the yoke 101 of the take-up pawl in the raised position of this pawl is well above the upper edges of the side walls or webs 97 of the plunger in order to provide complete freedom of movement for the pawl 99 to drop down so that its inclined surface 105 will ride upon the teeth 78 projecting upwardly from the upper edge of the rack bar 71.

Where the motor lever 64 projects through the forward end of the cylinder 59 which is slotted to receive the same, it is bifurcated or provided with a yoke of separated arms 108 and 109 to provide sufficient space therebetween for the rack bar 71 to slide through this yoke. At the same time the rear rounded or cam surfaces 110 of the arms 108, 109 engage the forward edge of the plunger head 96. These surfaces 110 roll on the forward face of the plunger head 96 incident to moving between the positions shown in full and dotted lines in Figure 3. While the lever 64 may be pivoted in any appropriate manner, in the form of the invention illustrated, a single lug 111 projects outwardly of the cylinder 59 on the opposite side from that arm of the lever 64 which is connected to the rod 66. This single lug 111 may come off the yoke 108, 109 at the angle indicated in Figure 3 which gives a certain mechanical advantage when entered between the two flanking fixed lugs 112 and 113 projecting outwardly from the cylinder 59. A slot 114 is preferably made in the lug 111 to receive the pivot pin 65 which is preferably of circular cross-section to thereby give a certain play or looseness of movement at the fulcrum point of the lever 64 thus avoiding any binding of this lever and permitting its curved cam surfaces 110 to readily accommodate themselves to the flat substantially vertical face of the plunger head 96 during the arcuate swinging movement of the lever 64 back and forth between the full and dotted line positions of Figure 3. The location of pin 200 toward and from the fulcrum pin 65 can be varied when it is necessary to change the location of pin 201 to limit the amount of power required to actuate the regulator motor spring to its full operating stroke.

The forward end head 115 of the cylinder 59 constitutes a convenient stop for the lever 64 in its most forward position. Any other stop may be employed for the purpose. Where the end head 115 is provided, an opening 116 therethrough permits of the free passage of the rack bar 71 as it is moved step by step in a forward direction. This forward direction is the slack take-up movement of the rack bar 71. The movement of the rack bar 71 to the right as illustrated in Figures 5 and 6 is the slack restoring movement of such rack bar.

The slots in the forward end of the cylinder 59 which accommodate the motor lever 64 are indicated at 117 and 118 in Figure 3. In Figures 3 and 4, ears 119, 120 extend out in mating relationship from proximate portions of the cylinder 59 and rack bar housing 58, these ears being perforated to receive bolts or other appropriate fastenings by which the rack bar housing 58 and the cylinder 59 may be coupled together as a unit.

In operation, in a newly-constructed freight car or with new brake shoes, the rack bar 71 will be in an initial position at its extreme right-hand placement. The holding pawl 69 will be engaged with the lower teeth 75 of the rack bar preventing the weight of the brake rigging from pulling the rack bar 71 any further to the right or in a rearward direction which would increase the slack in the rigging. In this position the brake shoes have been adjusted to an ideal clearance position from the wheels of the freight car.

When the engineer makes an application of the brakes, the push rod 41 in Figures 1 and 2 moves to the right causing corresponding movement of the brake lever 42 which movement is communicated to the brakes on both end trucks in a familiar manner through the rods 44, 49 and 53. In so doing, pull will be exerted upon the rod 66 which is connected to the motor lever 64, causing the latter to shift from the full line position of Figure 3 to the dotted line position in the same figure. This new position of the motor lever 64 is also shown in Figure 13 wherein the motor lever has moved the plunger to the right or rearwardly through a preselected linear stroke, compressing the spring 91 and placing the same in a potential condition for reactionary thrust, when released, to the left or forwardly. This might be referred to as the cocked position of the motor. In this position, see Figure 14, the lower ends of the legs of the take-up pawl 99 have moved away from the blank cylinder walls and into the slots 106 permitting the take-up pawl 99 to drop by gravity to the positions of Figures 14 and 15.

The slack adjuster is triggered for movement when the engineer releases the air from the brake cylinder 40 whereupon the potential energy stored in the spring 91 may become kinetic for driving the plunger 96, 95 forwardly. Inasmuch as the take-up pawl 99 is entrained to move with this plunger, the pawl will be carried forwardly. In the first instance the inclined wall 105 of the pawl will slide down the inclined wall of the engaged tooth 78 in the rack bar 71 until the working face 107 of the pawl abuts against the next forward abrupt shoulder 79 of a tooth 78. This condition is shown in Figure 15. The rack bar 71 is now entrained to move with the plunger and as the plunger moves forward under the influence of the expanding spring 91, the rack bar 71 is carried therewith. During the course of the movement, the inclined surfaces 103 and 104 will approach one another as shown in Figure 15. When in contact, further forward movement of the plunger will be accomplished by a raising movement of the take-up pawl 99 such as will disengage it from the tooth of the rack bar 71.

After the disengagement, the forward movement of the plunger may continue until the lever 64 strikes the stop 115 which completes the forward movement of the motor. Due to the inclination of the teeth 75 and 81 the holding pawl 69 will permit this forward step by step movement of the rack bar 71, the holding pawl 69 rotating counterclockwise through a small angle to permit of this movement. The initial tooth of the holding pawl 69 which is the tooth to the extreme right, will be held by the spring 88 always in contact with the teeth 75 of the rack bar, such tooth engaging the rack bar in a pawl and ratchet operation so that as soon as the rack bar is freed from the take-up pawl 99 and tends to return in the right hand or rearward directions, the holding pawl 69 will be rotated thereby in a clockwise direction to engage its teeth 81 with the rack bar teeth 75 and thereby interlock in such way as to prevent any but a limited return movement of the rack bar 71. One or more teeth may be provided upon the holding pawl 69. For strength it is desirable to have a number of teeth as shown more particularly in Figure 6.

So long as the piston in the brake cylinder 40 does not exceed the maximum prescribed travel, the motor lever 64 will not be rotated through a sufficient angular distance to cock the motor. However, when linear travel of the brake piston and push rod 41 exceeds a predetermined maximum, then the plunger will be moved to such position as to engage the take-up pawl 99 with the rack bar 71. Thus the rack bar 71 may be moved to the left or forwardly by small increments of one or more teeth. In so doing the fulcrum point 63 of the floating lever 52 is moved progressively to the left as shown in Figure 1 thus changing this fulcrum point in a manner to act through the rods 49 and 53 to take up the slack throughout the brake rigging with respect to both end trucks.

Should a manual adjustment be required or desired, the floating lever 52 may be extended to provide a handle 121 as shown in Figure 1 which is easily accessible at the side of the car and which may be shifted to the left thus manually taking up the slack.

When the rack bar 71 has been moved to its ultimate forward position to the left and the brake shoes have been completely worn down, the rack bar may be restored to the original initial position by manually disengaging the holding pawl 69 from the rack bar and moving the handle 121 to the right. This is accomplished by rotating the release rod hand 68 in the counterclockwise direction (Fig. 15) until the finger 70 has pushed the heel or tail-piece 86 home to the right whereupon all teeth of the pawl 69 will be disengaged from the teeth 75 of the rack bar 71. In this condition the rack bar 71 may be pulled to the extreme righthand position to permit the application of new brake shoes. The holding pawl 69 is thereupon released for re-engagement to the rack bar 71 and the parts are in condition for operation as heretofore described.

Referring more particularly to Figures 16–18, inclusive, a modified form of holding device is shown in which the holding pawl is carried along with the rack bar 71ᵃ and the ratchet teeth 132 are carried by the housing 58ᵃ. In the form of the invention shown in these figures, two holding pawls 69ᵃ and 69ᵇ are provided at opposite ends of a trunnion 84ᵃ which is mounted in the loose bearing 85ª. These pawls 69ª and 69ᵇ are spaced apart by the bearing 85ª so that the same align with the two sets of ratchet teeth 132 which project downwardly from the bottom wall of the housing 58ª at opposite sides of the bottom slot 74ª.

The bearing 85ª is carried in a support or post 133 which depends from the reciprocating rack bar 71ª through the bottom opening or slot 74ª of the housing 58ª. The pawls 69ª and 69ᵇ are thus carried along with the rack bar and slide over the fixed inclined ratchet teeth 132 projecting from the bottom wall of the housing 58ª.

Also carried in said support 133 are spring abutments 134, one for each pawl 69ª and 69ᵇ in alignment with the tailpiece or heel 86ª of the two pawls. Coil springs 135 are fitted at their upper ends against the abutments 134. To the lower ends of the springs 135 are fitted spring plungers 136 having pilot stems 137 fitting loosely in sockets 138 of the tail piece 86ª. The lower end of the support or post 133 affords a bearing 139 for the release rod 67ª. This release rod is provided with a finger 70ª engageable beneath the tailpiece 86ª of the two pawls. The handle of the release rod is shown at 68ª. In Figure 17 the finger 70ª is shown as between two spaced bearings 202 and 203 for the release rod 67ª. In one bearing 203 is a slot 204 (Figure 16) for permitting the finger 70ª to slide through and past the bearing 203 in one angular position of the finger 70ª in assembling the release rod to its bearings.

In operation, it will be understood that the rack bar 71ª is moved step by step to the left in a slack take-up movement as hereinbefore described. In doing so through the support or post 133 it carries the pawls 69ª and 69ᵇ to the left in Figure 16 causing the teeth of the pawls to slide over the inclined surfaces of the ratchet teeth 132. In this operation the springs 135 are compressed and their expansive reaction tends to maintain the teeth of the pawls up against and into the teeth of the ratchet members 132. Thus when the rack bar 71ª is released from its motor and is pulled by the weight of the brake rigging in a righthand direction, the abrupt edges of the pawl teeth will encounter the abrupt faces of the ratchet teeth 132 and permit only a limited righthand movement.

When new shoes are required, the handle 68ª may be rotated in a clockwise direction from the viewpoint of Figure 16 thus raising the finger 70ª and in turn elevating the tailpiece 86ª to rotate the pawls 69ª and 69ᵇ in a clockwise direction which will withdraw completely the teeth of the pawls from the ratchet teeth 132 of the rack bar housing 58ª. Thus the rack bar with the pawls 69ª and 69ᵇ entrained may be moved to the right without interference from the pawls until such rack bar arrives at an origin position.

Referring more particularly to Figures 19–21 inclusive, another modified form of holding device is shown in which fixed rows of ratchet teeth 140 upstand from the bottom wall of the housing 58ᵇ. As shown two such rows of ratchet teeth 140 are provided, one row at each side of the bottom slot 74ᵇ in the housing 58ᵇ. The rack bar 71ᵇ is itself provided with one or more pawl teeth 141 which project down from the bottom edge of the rack bar and are shaped to mate and interfit with the teeth 140 of the ratchet members on the housing. The teeth are so mutually inclined that the rack bar 71ᵇ may without interference be moved step by step in a lefthand or slack take-up direction by a motor or otherwise. However, when the rack bar 71ᵇ is pulled by the weight of the brake rigging to the right, the abrupt shoulders of the ratchet teeth will interengage and permit only a limited righthand movement.

In this instance the rack bar 71ᵇ will be so mounted as to have a slight vertical movement in the housing in order that the teeth 141 may ride up upon the crests of the teeth 140 incident to the slack take-up incremental movements of the rack bar 71ᵇ. For instance the rest 205 in the housing for the rack bar may be rounded to permit a limited rocking movement of the rack bar 71ᵇ. Some appropriate yieldable means will be provided to exert a downward thrust upon the rear portion of the rack bar 71ᵇ in order to yieldably urge the pawl teeth 141 into engagement with the ratchet teeth 140. For instance a coil spring 142 may be mounted about the pin 63ᵇ beneath the head of the pin to engage against a wear washer 143 which slides on the pin and bears against the upper edge of the rack bar 71ᵇ.

As the teeth 141 ride up upon the inclined surfaces of the teeth 140, the spring 142 will be compressed, it being understood that the head 144 of the pin 63ᵇ is of greater diameter than the width of the slot 62ᵇ in the top wall of the housing 58ᵇ for which see Figure 21. The head 144 and pin 63ᵇ cannot therefore rise with the rising movement of the rear end portion of the rack bar 71ᵇ. As the high points of the teeth 140, 141 are cleared in the forward movement of the rack bar 71ᵇ the spring 142 will urge the rear end of rack bar downwardly. The rising and falling movement of the rack bar 71ᵇ is permitted by the rocking of the rack bar on its rounded rest 205.

When new shoes are required to replace worn out brake shoes the handle on lever 52ª is lifted upwardly in a vertical direction compressing spring 142 until the teeth 141 on rack bar 71ᵇ are completely disengaged from the teeth on housing 58ᵇ and held in this raised position while the handle is moved to the right in a slack restoring direction until the pin 63ᵇ is returned to the position of origin.

Although we have disclosed herein the best form of the invention known to us at this time, we reserve the right to all such modifications and changes as may come within the scope of the following claims.

What is claimed is:

1. For use in railway car foundation brakes a mechanical slack adjuster comprising a rack bar for connection to the brake rigging and movable in slack take-up and slack restoring directions, a plunger slidable relatively to the rack bar, a floating pawl for engaging said rack bar interlocked with the plunger for movement therewith, means for connection to a movable part of the brake mechanism and operatviely connected to the plunger for moving the plunger and pawl relatively to the rack bar in slack restoring direction, means engaging said pawl for holding the pawl out of engagement with the rack bar in its floating non-working position and allowing said floating pawl to move into engagement with said rack bar after a predetermined initial movement of the pawl relative to the rack bar in the slack restoring direction, means operatively connected to the plunger for driving the plunger and the interlocked pawl and rack bar in the opposite slack take-up direction, and holding means operatively connected to the rack bar for preventing the substantial return of the rack bar in slack restoring direction when freed from said pawl.

2. For use in railway car foundation brakes a mechanical slack adjuster comprising a rack bar for connection to the brake rigging and movable back and forth in slack take-up and slack restoring directions, a plunger movable back and forth relatively to the rack bar, a floating pawl interlocked with the plunger for movement therewith and movable relative to the plunger and rack bar into and out of interlocking relation with the rack bar, mechanical means for connection to a movable part of the brake mechanism and operatively connected to the plunger for moving the plunger and pawl relatively to the rack bar in slack restoring direction, means operatively connected to said pawl for holding the pawl out of engagement with the rack bar in its floating non-working position and allowing said floating pawl to move into engagement with said rack bar after a predetermined initial movement of the pawl relative to the rack bar in the slack restoring direction, means operatively connected to the plunger for driving the plunger and the interlocked pawl and rack bar in the opposite slack take-up direction, and holding means operatively connected to the rack bar for preventing the substantial return of the rack bar in slack restoring direction when freed from said pawl.

3. For use in railway car foundation brakes a mechanical slack adjuster comprising a rack bar for connection to the brake rigging and movable back and forth in slack take-up and slack restoring directions, a plunger movable back and forth relatively to the rack bar, a floating pawl interlocked with the plunger for movement therewith and movable relative to the rack bar into and out of interlocking engagement with the rack bar, mechanical means for connection to a movable part of the brake mechanism and operatively connected with the plunger for moving the plunger and pawl relatively to the rack bar in slack restoring direction, means engaging said pawl for holding the pawl out of engagement with the rack bar in its floating non-working position and allowing said floating pawl to drop into engagement with said rack bar after a predetermined initial movement of the pawl relative to the rack bar in the slack restoring direction, means operatively connected with the plunger for driving the plunger and the interlocked pawl and rack bar in the opposite slack take-up direction, said pawl engaging means also serving to shift the pawl relatively to the rack bar out of engagement with the rack bar toward the end of the slack take-up stroke, and holding means operatively connected with the rack bar for preventing the substantial return of the rack bar in slack restoring direction when freed from said pawl.

4. For use in railway car foundation brakes a mechanical slack adjuster comprising a rack bar for connection to the brake rigging and movable back and forth in slack take-up and slack restoring directions, a plunger movable back and forth relatively to the rack bar, a floating pawl interlocked with the plunger for movement therewith and movable relative to the rack bar into and out of interlocking relation with the rack bar, mechanical means for connection to a movable part of the brake mechanism and operatively connected with the plunger for moving the plunger and pawl relatively to the rack bar in slack restoring direction, means engaging said pawl for holding the pawl out of engagement with the rack bar in its floating non-working position and allowing said floating pawl to drop into engagement with said rack bar after a predetermined initial movement of the pawl relative to the rack bar in the slack restoring direction, means operatively connected with the plunger for driving the plunger and the interlocked pawl and rack bar in the opposite slack take-up direction, said pawl engaging means also serving to shift the pawl relatively to the rack bar out of engagement with the rack bar toward the end of the slack take-up stroke, a holding pawl engaging the rack bar in a pawl and ratchet operation, and means for yieldably urging the holding pawl into engagement with the rack bar whereby to limit slack restoring movement of the rack bar when freed from the floating pawl.

5. For use in railway car foundation brakes, a slack adjuster comprising a rack bar for connection to the brake rigging and movable back and forth in slack take-up and slack restoring movements, a floating pawl for engaging said rack bar, means for connection to a movable part of the foundation brake and operatively connected to the pawl for moving the pawl relatively to the rack bar in slack restoring direction, means engaging said pawl for holding the pawl out of engagement with the rack bar in its floating non-working position and allowing said pawl to move into engagement with the rack bar after a predetermined initial movement of the pawl relative to the rack bar in the slack restoring direction, means operatively connected with the pawl for driving the pawl and entrained rack bar in slack take-up direction, and holding means operatively connected with the rack bar for preventing the substantial return movement of the rack bar in slack restoring direction when freed from said pawl.

6. For use in railway car foundation brakes, a slack adjuster comprising a rack bar for connection to the brake rigging and movable back and forth in slack take-up and slack restoring movements, a floating pawl movable back and forth with respect to the rack bar for engaging said rack bar, mechanical means for connection to a movable part of the foundation brake and operatively connected to the pawl for moving the pawl relatively to the rack bar in slack restoring direction, means engaging said pawl for holding the pawl out of engagement with the rack bar in its floating non-working position and allowing said pawl to move into engagement with the rack bar after a predetermined initial movement of the pawl relative to the rack bar in the slack restoring direction, means operatively connected with the pawl for driving the pawl and entrained rack bar in slack take-up direction, said pawl engaging means also serving to shift the pawl relatively to the rack bar out of engagement with the rack bar toward the end of the slack take-up stroke, and holding means operatively connected with the rack bar for preventing the substantial return movement of the rack bar in slack restoring direction when freed from said pawl.

7. For use in railway car foundation brakes, a slack adjuster comprising a rack bar for connection to the brake rigging and movable back and forth in slack take-up and slack restoring directions, a floating pawl movable back and forth relatively to the rack bar for interlocking with said rack bar, mechanical means for connection to a movable part of the foundation brake and operatively connected to the pawl for moving the pawl relatively to the rack bar in slack restoring direction, means engaging said pawl for holding the pawl out of engagement with the rack bar in its floating non-working position and allowing said pawl to move into engagement with the rack bar after a predetermined initial movement of the pawl relative to the rack bar in the slack restoring direction, spring means operatively connected with the pawl for driving the pawl and entrained rack bar in slack take-up direction, said pawl engaging means also serving to shift the pawl relatively to the rack bar out of engagement with the rack bar toward the end of the slack take-up stroke, and holding means operatively connected with the rack bar for preventing the substantial return movement of the rack bar in slack restoring direction when freed from said pawl.

8. For use in railway car foundation brakes, a slack adjuster comprising a pair of complemental members one of said members having means for connecting it to the brake rigging and movable back and forth on slack take-up and slack restoring strokes, the other of said members being a floating member and having means thereon for interlocking with said one member, means for connection to a movable part of the foundation brake and operatively connected to said other member for moving the said other member relatively to the said one member in slack restoring direction, means engaging said other member for holding said other member out of engagement with the said one member in its floating non-working position and allowing said other member to move into engagement with the said one member after a predetermined initial movement of the said other member relatively to the said one member in the slack restoring direction, means operatively connected with the said other member for driving the interlocked complemental members in slack take-up direction, and holding means operatively connected with the said one member for preventing the substantial return movement of the said one member in slack restoring direction when freed from said other member.

9. For use in railway car foundation brakes, a slack adjuster comprising two complemental members relatively movable in slack take-up and slack restoring directions, one member having means to connect it to the brake rigging, the other member being a floating member and having means thereon for interlocking with said one member for movement therewith, means for connection to a movable part of the foundation brake and operatively connected to said other member for moving the other member relatively to the one member in slack restoring direction, means engaging said other member for holding it out of engagement with said one member in its floating non-working position and allowing said other member to move into engagement with said one member after a predetermined initial movement of the other member relative to the one member in the slack restoring direction, spring means operatively connected to said other member compressed by the movement of the other member in the slack restoring direction whereby to drive said engaged members in the slack take-up direction, said other member engaging means also serving to move said other member relatively to said one member out of engagement with the one member at the end of the take-up stroke, and holding means operatively connected with the one member for preventing the substantial return movement of the other member in slack restoring direction when freed from said other member.

10. For use in railway car foundation brakes, a slack adjuster comprising a rack bar for connection to the brake rigging and movable in slack take-up and slack restoring directions, a plunger slidable relatively to the rack bar, a pawl entrained to move with the plunger and slidable relatively to the plunger into and out of interlocking engagement with said rack bar, means for connection to a movable part of the foundation brake for shifting the plunger in slack restoring direction to interlock with the rack bar, means operatively connected with the plunger for driving the plunger and pawl in the opposite slack take-up direction with the rack bar entrained therewith, a cylinder for slidably receiving the plunger and rack bar and having a slot in its lower portion for receiving a lower portion of the pawl to permit its slidable movement in the plunger for interlocking engagement with the rack bar, and a cam abutment on the cylinder at the forward portion of the slot in position to encounter the lower portion of the pawl and guide the same slidably and out of interlocking engagement with the rack bar during the end portion of the forward stroke of the plunger, and holding means operatively connected with the rack bar for preventing the substantial return movement of the rack bar in slack restoring direction when freed from said pawl.

11. For use in the foundation brakes of railway freight cars, a slack adjuster comprising a rack bar for connection to the brake rigging and movable on slack take-up and slack restoring movements, a motor for driving said rack bar intermittently in a slack take-up direction comprising a cylinder through which the rack bar is mounted to move, a plunger also movable in said cylinder relatively to the rack bar and extending about the rack bar, a substantially horseshoe shaped pawl entrained to move with the plunger and straddling the rack bar and comprising an upper yoke and dependent legs having lower beveled forward edges, said cylinder having a slot for permitting the pawl to drop by gravity into interlocking engagement with the rack bar, a cam abutment on the cylinder extending down at the forward end of the slot for encountering the beveled ends of the legs for raising the pawl out of interlocking engagement with the rack bar incident to the forward movement of the plunger, means operatively connected with the plunger for moving the plunger in a slack restoring direction, and means operatively connected with the plunger for moving the plunger in slack take-up direction, and holding means operatively connected with the rack bar for preventing the substantial return movement of the rack bar in slack restoring direction when freed from said pawl.

12. For use in railway car foundation brakes, a slack adjuster comprising a rack bar for coupling to the brake rigging and movable in slack take-up and said slack restoring directions, a motor for driving said rack bar comprising a cylinder having a slot in its lower portion, a cam abutment projecting down from the cylinder at the forward portion of said slot, a plunger mounted to reciprocate in the cylinder and to slide relatively over the rack bar, said plunger comprising spaced heads and connecting walls between the heads of low height and spaced laterally to permit the rack bar to slide between the same, a pawl comprising a yoke member and depending legs, said yoke member fitted to slide freely up and down between the end heads of the plunger and above the upper ends of the connecting walls, said legs being slidable up and down on opposite sides of said walls, said yoke having an inclined surface therebeneath to mate with the teeth of the rack bar, the lower ends of said legs having beveled forward portions for mating with the cam abutment, means operatively connected with the plunger for driving said plunger in a slack restoring direction to permit the legs of the pawl to drop through the slot of the cylinder and the inclined surface of the yoke to descend upon the teeth of the rack bar, and means operatively connected with the plunger for driving the plunger and pawl with the entrained rack bar in a slack take-up direction and ultimately against said cam abutment to cause the pawl to ride up into the cylinder and out of interlocking engagement with the rack bar, and holding means operatively connected with the rack bar for preventing the substantial return movement of the rack bar in slack restoring direction when freed from said pawl.

13. For use in railway car foundation brakes, a slack adjuster comprising a rack bar for connection to the brake rigging and movable in slack take-up and slack restoring directions, means for intermittently moving the rack bar in slack take-up direction comprising a floating pawl for interlocking with the rack bar, means engaging said pawl for holding the pawl out of interlocking relation with the rack bar in its floating non-working position and allowing the pawl to move into interlocking engagement with the rack bar after a predetermined initial movement of the pawl relative to the rack bar in the slack restoring direction, a housing in which the rack bar is mounted to reciprocate, and holding means operatively connected to the rack bar and housing for restraining the rack bar from substantial movement in slack restoring direction and comprising means mounted between the rack bar and housing and having relatively movable cooperating parts shiftable to permit movement of the rack bar in a slack take-up direction but to interlock with the rack bar after limited movement in slack restoring direction.

14. For use in railway foundation brakes, a slack adjuster comprising a rack bar member for connection to the brake rigging, a housing member in which the rack bar is movable back and forth in slack take-up and slack restoring directions, means operatively connected to the rack bar member for moving the rack bar member step by step in slack take-up direction comprising a floating pawl for engagement with the rack bar member, means engaging said pawl for holding the pawl out of engagement with the rack bar member in its floating non-working position and allowing said pawl to move into engagement with the rack bar member after a predetermined initial movement of the pawl relative to the rack bar member in the slack restoring direction, and means for restricting the slack restoring movement of the rack bar member comprising a series of fixed ratchet teeth on one of said members and a movable pawl on the other member for interlocking with the ratchet teeth when the rack bar member is moved in slack restoring direction but to permit the rack bar member to move freely in slack take-up direction.

15. For use in railway foundation brakes, a slack adjuster comprising a rack bar member for connection to the brake rigging, a housing member in which the rack bar is movable back and forth in slack take-up and slack restoring directions, means operatively connected to the rack bar member for moving the rack bar member step by step in slack take-up direction comprising a floating pawl for engagement with the rack bar member, means engaging said pawl for holding the pawl out of engagement with the rack bar member in its floating non-working position and allowing said pawl to move into engagement with the rack bar member after a predetermined initial movement of the pawl relative to the rack bar member in the slack restoring direction, means for preventing substantial movement of the rack bar member in slack restoring direction comprising a series of fixed teeth on the housing member and pawl teeth carried by the rack bar member slidable over the teeth of the housing member incident to slack take-up movement of the rack bar member but to interlock with the housing member teeth in the slack restoring direction of movement of the rack bar member, and yieldable means operatively connected to the rack bar member teeth for urging the teeth of both members together.

16. For use in railway foundation brakes, a slack adjuster comprising a rack bar member for connection to the brake rigging, a housing member in which the rack bar is movable back and forth in slack take-up and slack restoring directions, means operatively connected to the rack bar member for moving the rack bar member step by step in slack take-up direction comprising a floating pawl for engagement with the rack bar member, means engaging said pawl for holding the pawl out of engagement with the rack bar member in its floating non-working position and allowing said pawl to move into engagement with the rack bar member after a predetermined initial movement of the pawl relative to the rack bar member in the slack restoring direction, said housing member having a longitudinal bottom slot and a series of ratchet teeth extending downwardly from the bottom adjacent said slot, a support carried by and movable with the rack bar member and projecting down through the bottom slot of the housing, a holding pawl carried by the support below the housing for engagement with the ratchet teeth, and means carried by the support for yieldably urging the holding pawl into engagement with the ratchet teeth.

17. For use in railway foundation brakes, a slack adjuster comprising a rack bar member for connection to the brake rigging, a housing member in which the rack bar is movable back and forth in slack take-up and slack restoring directions, means operatively connected to the rack bar member for moving the rack bar member step by step in slack take-up direction comprising a floating pawl for engagement with the rack bar member, means engaging said pawl for holding the pawl out of engagement with the rack bar member in its floating non-working position and allowing said pawl to move into engagement with the rack bar member after a predetermined initial movement of the pawl relative to the rack bar member in the slack restoring direction, said housing member having upstanding ratchet teeth in the bottom portion thereof, a rest on said housing member rockingly supporting an intermediate portion of the rack bar member, pawl teeth carried by the lower rear portion of the rack bar member in position to engage with and slide over the ratchet teeth during the movement of the rack bar member on the slack take-up stroke but to interlock with the ratchet teeth in the slack restoring direction of movement of the rack bar member, and means operatively connected to both members for yieldably urging the rear portion of the rack bar member and its pawl teeth downwardly against the ratchet teeth of the housing member.

References Cited in the file of this patent
UNITED STATES PATENTS

| | | |
|---|---|---|
| 1,072,313 | Conte | Sept. 2, 1913 |
| 1,327,611 | Burns et al. | Jan. 13, 1920 |
| 1,933,094 | Camp | Oct. 31, 1933 |
| 1,947,405 | Camp | Feb. 13, 1934 |
| 1,991,262 | Sauvage | Feb. 12, 1935 |
| 2,712,861 | Gaver | July 12, 1955 |